No. 697,891. Patented Apr. 15, 1902.
H. F. SCHRADER.
AMUSEMENT APPARATUS.
(Application filed Dec. 7, 1901.)
(No Model.)
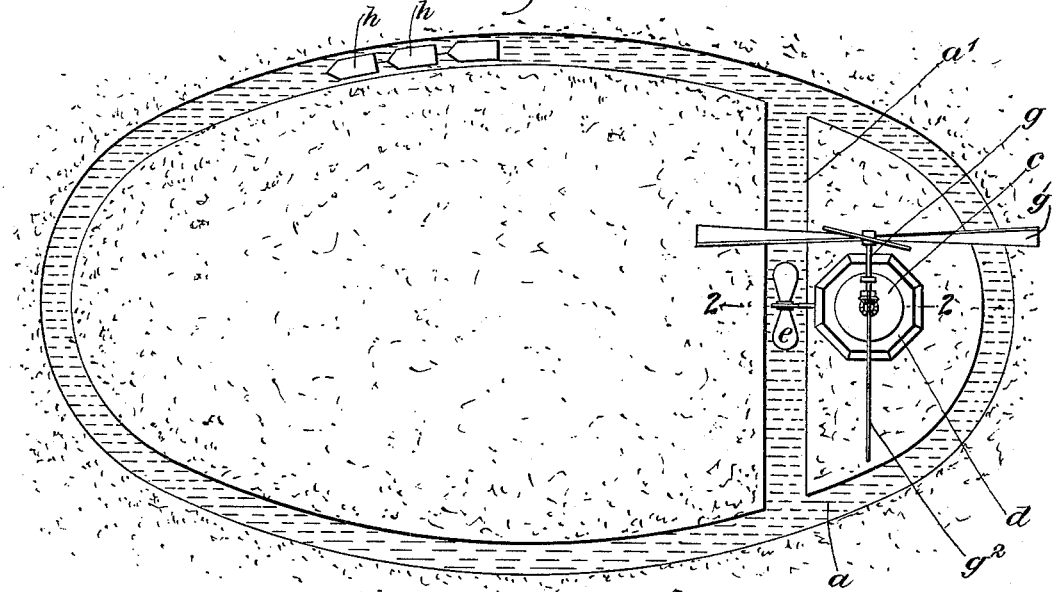
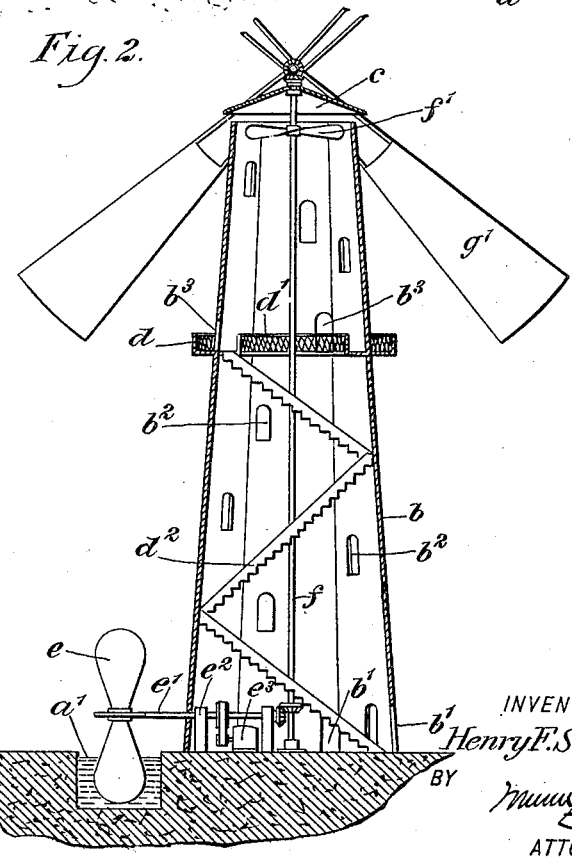
WITNESSES:
Edward Thorpe
J. B. Owens.
INVENTOR
Henry F. Schrader
BY
ATTORNEYS
THE NORRIS PETERS CO., PHOTO-LITHO., WASHINGTON, D. C.

UNITED STATES PATENT OFFICE.

HENRY F. SCHRADER, OF BROOKLYN, NEW YORK.

AMUSEMENT APPARATUS.

SPECIFICATION forming part of Letters Patent No. 697,891, dated April 15, 1902.

Application filed December 7, 1901. Serial No. 84,993. (No model.)

*To all whom it may concern:*

Be it known that I, HENRY F. SCHRADER, a citizen of the United States, and a resident of the city of New York, borough of Brooklyn, in the county of Kings and State of New York, have invented a new and Improved Amusement Apparatus, of which the following is a full, clear, and exact description.

This invention relates to an amusement device simulating an old Dutch windmill and its surroundings, these including a canal or mill-race through which boats are drawn by any desired power.

This specification is a specific description of one form of the invention, while the claims are definitions of the actual scope thereof.

Reference is to be had to the accompanying drawings, forming a part of this specification, in which similar characters of reference indicate corresponding parts in both views.

Figure 1 is a plan view of the invention, and Fig. 2 is a vertical section thereof on the line 2 2 in Fig. 1.

$a$ indicates an oval ditch or canal simulating a mill-race, this being formed in the ground and having suitable width and depth. Across one end of the mill-race runs a branch $a'$, communicating with each side of the oval described by the mill-race.

Built at the side of the branch $a'$ is the windmill-tower $b$, which is preferably an octagonal structure with openings $b'$ at its base, these openings forming doors, and with various windows $b^2$ along its height. The top of the tower $b$ is open and is covered by a cowl $c$ to prevent the weather from entering the tower. An exterior balcony $d$ is constructed near the top of the tower, and an interior balcony $d'$ is opposite the exterior balcony. The tower is provided with doors $b^3$, leading from the interior to the exterior balcony, and $d^2$ indicates flights of stairs leading from the base of the tower and to the balcony $d$. These balconies $d$ and $d'$ extend completely around the tower.

$e$ indicates a paddle-wheel, which may be of any form desired and which is mounted on a shaft $e'$. This shaft is revolubly carried in bearings $e^2$, situated in the base of the tower.

$e^3$ indicates an electric or other motor connected with the shaft $e'$ to drive it. The rotation of the paddle $e$ in the branch $a'$ of the mill-race causes the water to circulate through the same, thus simulating the natural flow of water in a mill-race, and, if desired, the paddle-wheel $e$ may be made after the manner of the usual undershot water-wheels, so as to convey the impression that the paddle is being driven by the current of the mill-race. In practice the parts $e^2$ and $e^3$ in the base of the tower will be suitably concealed from the public view.

The shaft $e'$ is geared with and drives a vertical shaft $f$, extending through the longitudinal axis of the tower. This shaft projects up to the top of the tower, and the cowl $c$ is loosely mounted on the shaft. At the top of the tower is arranged an exhaust-fan $f'$, carried fast on the shaft $f$. The rotation of the shaft $f$, and consequently the fan $f'$, will induce a strong current of air upward through the tower, thus keeping the interior of the tower cool and adding to the comfort of the persons therein. On the top of the cowl $c$ is mounted the shaft $g$ of an ordinary wind-wheel $g'$. The cowl also carries the tail-vane $g^2$ of the wind-wheel, which under the action of the wind serves to keep the wheel $g'$ headed toward the wind. The action of the wind on the wheel $g'$ will drive the same, thus adding to the attractiveness of the same, and it will also cause a material disturbance of the air around the balcony $d$, which will add to the comfort of the persons thereon. It will be observed that the cowl $c$ turns with the shaft $g$ as it shifts from one position to the other under the action of the wind acting on the vane $g^2$.

This apparatus arranged as shown, with various auxiliaries of ornamentation and attraction, which in themselves are not considered important to this case, will afford much amusement and recreation to children and other pleasure-seekers.

$h$ indicates a number of boats which are adapted to be connected together after the manner of a tow and to be propelled through the mill-race $a$ either by the current of water created by the wheel $e$ or, if desired, by any other source of power. For example, a horse may be employed as a tow-horse and the boats $h$ may be constructed to simulate the conventional type of canal-boat.

Various changes in the form and details of my invention may be resorted to at will without departing from the spirit of my invention. Hence I consider myself entitled to all forms of the invention as may lie within the intent of my claims.

Having thus described my invention, I claim as new and desire to secure by Letters Patent—

1. An amusement device, comprising means constituting a ditch or canal, a tower located adjacent to said means and having openings at its top and bottom, stairs running up into the tower, a shaft extending vertically through the tower, an exhaust-fan carried on the shaft at the upper part of the tower, a horizontal shaft mounted at the base of the tower and geared with the vertical shaft, means for driving the shafts, and a paddle-wheel carried on the horizontal shaft and working in said ditch or canal.

2. An amusement device, comprising means constituting a ditch or canal, a tower located adjacent to said means and having an opening at its bottom and an opening at its upper portion, stairs leading up the tower to the opening in the upper portion thereof, a shaft extending vertically through the tower, a fan carried on the upper part of the shaft, a horizontal shaft mounted at the base of the tower and geared with the vertical shaft, and means attached to the horizontal shaft, such means coacting with the means forming the ditch or canal.

3. An amusement device, comprising a tower with an inner balcony in the upper portion thereof, an outer balcony opposite the inner balcony, the tower having an opening leading from one balcony to the other, a stair running through the tower and leading to the inner balcony, means forming a ditch or canal adjacent to the tower, a horizontal shaft mounted in the base of the tower and projecting therefrom, means attached to the horizontal shaft and coacting with the means forming the ditch or canal, a vertical shaft extending through the tower and geared with the horizontal shaft, and a fan at the upper end of the vertical shaft.

4. An amusement device, comprising means constituting a ditch or canal, a tower located adjacent to said means and having openings at its top and bottom portions, stairs running up into the tower, a shaft extending vertically through the tower, a fan carried on the shaft at the upper part of the tower, a cowl mounted loosely on the shaft above the tower, a wind-wheel and vane carried in the cowl, and means geared with the vertical shaft and coacting with the said means forming the ditch or canal.

In testimony whereof I have signed my name to this specification in the presence of two subscribing witnesses.

HENRY F. SCHRADER.

Witnesses:
I. B. OWENS,
JNO. M. RITTER.